INVENTORS
WEBB R. PHILLIPS
JAMES L. GADDY JR.
BY REUBEN E. RUSSELL JR.

ATTORNEY

Sept. 27, 1966   W. R. PHILLIPS ET AL   3,275,893
GAS COOLED ELECTRICAL EQUIPMENT FOR DISTRIBUTION SYSTEMS
Filed May 31, 1963   2 Sheets-Sheet 2

INVENTORS
WEBB R. PHILLIPS
JAMES L. GADDYS JR.
BY REUBEN E. RUSSELL JR.

ATTORNEY

United States Patent Office 3,275,893
Patented Sept. 27, 1966

3,275,893
GAS COOLED ELECTRICAL EQUIPMENT FOR DISTRIBUTION SYSTEMS
Webb R. Phillips, James L. Gaddy, Jr., and Reuben E. Russell, Jr., Pine Bluff, Ark., assignors to Central Transformer Corporation, Pine Bluff, Ark., a corporation of Arkansas
Filed May 31, 1963, Ser. No. 284,496
4 Claims. (Cl. 317—100)

This invention relates to the improvements in gas filled electrical equipment, and more particularly to transformers which are enclosed in a gas tight housing charged under pressure by a gas, of higher dielectric qualities than air, resistant to ionization, having properties suitable to prevent, and unfavorable for sustaining, an electric arc, so that the transformer housing provides a safe environment for not only the usual current carrying transformer components, but also for circuit interrupter gear carrying heavy current.

It has been proposed heretofore to mount circuit interrupters submerged within a transformer housing filled with an oil which has these dielectric properties. This proposal is not regarded as too practical by some electrical engineers because opening an oil submerged type of circuit interrupter under a heavy current loading usually results in some contamination of the oil due to metal vaporization. This would be likewise true, to some extent at least, of any other known dielectric fluid substituted for an oil. It has been realized for some time that during the separation of the contacts of a circuit interrupter, electrical resistance between the contacts increases momentarily to extremely high values before the circuit has actually broken. At high current loading, momentary extreme high temperatures will occur as the contacts open because of this increase in electrical resistance. These temperatures are sufficient to vaporize some of the metal from the contacts, whether or not the arcing, which usually follows, is suppressed by the environment in which the contacts are separated. If this environment is an oil, the vaporized metal mixes with the oil as a contaminant. This would likewise be true in other dielectric fluids. Contamination of a fluid in this manner can eventually build up by successive contact opening to a point causing a short circuit. The fluid, therefore, loses some of its dielectric properties and its margin of safety is lost. If this occurs within a transformer, the damage to the entire machine can be extensive and, more important, produce a prolonged interruption in electric service.

The risk involved in using the transformer fluid, whatever its kind, to quench the arc of a circuit interrupter is one that is ever present, because there seems to be no true indicator of the amount of contamination; there is no way of telling how many times contacts have been opened; and, the degree of contamination may not be the sole determinant of imminent danger, it may be a combination of the degree and the time involved.

It is known that some carbonization of the oil in an oil quenched switch takes place because of arcing, and liberated carbon deposited by the oil on the windings of a transformer will reduce the original dielectric strength between the windings. Insulation resistance of the oil (Megger readings) are reduced, but only to a small extent and may not indicate trouble.

Arcing increases oil acidity and in turn sludging with possible blocking of flow, which in a transformer means overheating.

Repeated arcing in oil can result in so decreasing its dielectric strength that there is a probability of prolonged arc and a resulting explosion from increase in internal pressure or ignition.

It is also now known that even oils of high quality and purity used in transformers deteriorate to some extent with use. Changes in temperature cause the oil to absorb gases which decrease the ability of the oil to quench an arc. Of course, the more arcing which takes place, the greater the amount of heat and contact metal vaporized, and the amount of contamination added to the oil.

In spite of the risks involved, some electric service companies have adopted oil filled transformers mounting a circuit interrupter submerged in the transformer oil. The convenience in installation, and the saving in space, seem to have been the reasons which outweighed the risk.

It is one of the objects of this invention to provide a transformer and a circuit interrupter in the same housing, charged with a fluid of dielectric properties which eliminates the probability of contamination of the fluid and the consequent risks.

It is another object of this invention to provide means for eliminating the probability of contamination of the dielectric fluid in a transformer housing by metal vaporized from the contacts of a circuit interrupter submerged in the dielectric fluid.

This invention pertains to transformers which are enclosed in a housing which also encloses one or more circuit interrupters submerged in the same dielectric fluid used to insulate and cool the transformer and its current carrying components. In this case, the housing of the transformer contains a gas rather than an oil. This gas is preferably inert, non-toxic, non-inflammable, and with a density in excess of air at the same pressure. There are several halogen compound gases which meet these specifications and these eliminate most of the risks in using oil. One gas of this kind which will serve as an example is sulphur hexafluoride. When under pressure, $SF_6$ has the same dielectric properties as oil. It is the use of a gaseous medium, rather than a liquid medium, which makes this invention possible, as will appear from the following brief description.

In a gaseous medium, certain currents will be set up by convection due to the heating effect produced during operation of the transformer current carrying components. If these components are properly located, the convection current will be confined primarily to a predetermined path of movement from zones of relatively high temperature through zones of decreasing temperature gradient before returning to the relatively high temperature zone. Relatively cooler surfaces of the transformer housing provide the zones of decreasing temperature gradient because these portions of the housing present cooler surfaces. The cooler surfaces can be any one of the metal walls of the transformer housing remote from the heat. The concept here is to locate the circuit interrupters within the housing in a position where any metal vaporization from the contacts of a circuit interrupter will be picked up immediately by gas circulation and conveyed through the zones of decreasing temperature gradient. Natural circulation of the gas and vapor mixture will almost immediately contact a cooler surface and the vapor condense. Because of this natural circulation in the gas, substantially all vapor can be removed and contamination avoided. Any metal vaporized by the opening of the contacts of a circuit interrupter will be carried away from locations where there is a risk of damage to current carrying transformer components. The vapor is condensed almost immediately on a more remote cooler surface. Only minute quantities would remain as a contaminant in the gas, and the consequent risk of failure of some transformer component from a short circuit due to contamination alone becomes an extremely remote possibility.

In order to maintain the circulation of gas in a predetermined path, the housing of the machine may be provided with baffles of the kind shown in the patent to Smith et al. 3,079,573 of February 26, 1963.

Preferably, the transformer housing is charged with one of these halogen compound gases at higher than atmospheric pressure, because the dielectric strength of gas increases with density, and density with gas pressure. Whatever, the initial pressure in the charge of gas in the housing, when the machine is loaded, its temperature will increase causing pressure and density of the gas to increase. This is advantageous because dielectric strength increases with an increase in gas density.

Other objects and advantages of this invention will appear from the following detailed description which is in such clear, concise and exact terms as will enable any one skilled in the art to make and use the same when taken in conjunction with the accompanying drawings, forming a part thereof, and in which.

Figure 4:
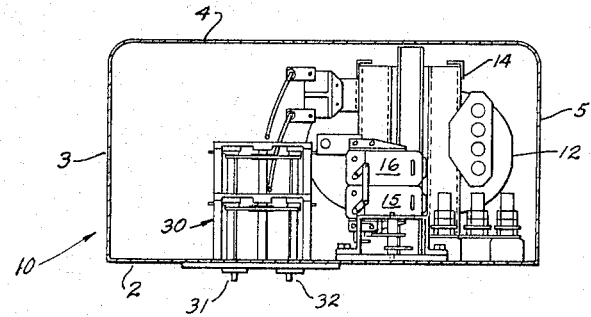
FIG. 4 is a schematic illustration looking down on the top of the transformer housing shown in FIG. 1 after the top has been removed.
Figure 1:
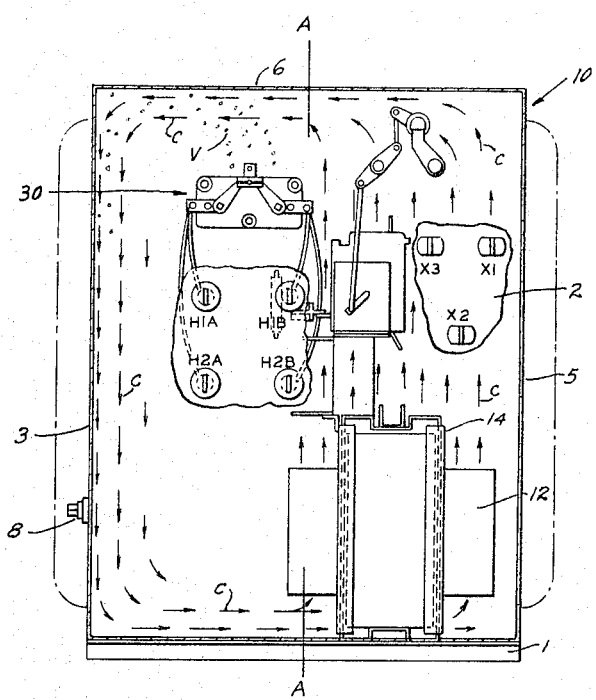
FIG. 1 is a schematic illustration of a transformer housing with parts broken away showing the major components within the housing to illustrate the principle involved as applied to existing transformer equipment.
Figure 3:
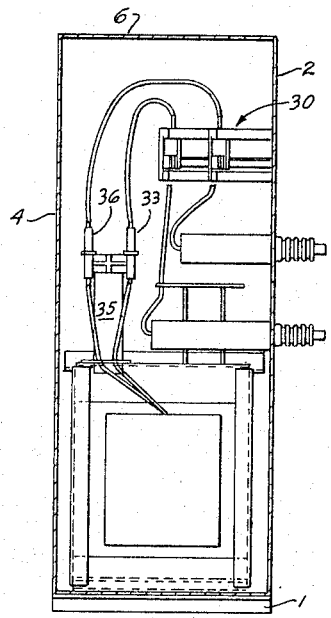
FIG. 3 is a schematic illustration of the left or high voltage side of the housing shown in FIG. 1 with a side panel removed so as to illustrate the location of components of the transformer in the housing which are located to the left of line A—A of FIG. 1.
Figure 2:
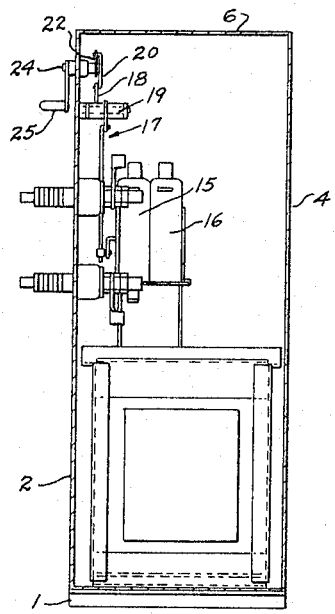
FIG. 2 is a schematic illustration of the right or low voltage side of the housing shown in FIG. 1 with the side panel removed to illustrate the location of the transformer components within the housing.

Although the drawings show a pad mounted type of transformer, this invention is not concerned with the type, but with the manner in which electrical components are located within a gas cooled type of transformer. For this reason, the components, illustrated schematically in the drawings, will not be described in detail but only as to preferred location.

The housing 10 for the transformer is shown in FIGS. 1–4, inclusive, and consists of a base 1, sides 2, 3, 4 and 5, and top 6 connected edge to edge forming a gas tight rectangular chamber. Removable plug 8 is provided for charging the chamber with gas. Other connections can be provided for venting, purging, or recharging. The line A—A on FIG. 1 divides the housing 10 roughly into two sections, a high voltage side to the left of the line A—A and a low voltage side to the right.

Mounted on the base 1 to the right of the line A—A is a transformer 12 secured to the base 1 by a frame mounting, generally indicated as 14. Two pair of high voltage bushings H1A–H1B and H2A–H2B are located one above the other and project through the front side panel 2 to the left or high voltage side of the dividing line A—A in FIG. 1. This machine has two pair of high voltage bushings to provide connection to two loop distribution circuits A and B. A single pair is all that is required where the machine is connected to a single loop grounded Y circuit. On the right or low voltage side are low voltage bushings X1, X2 and X3 also projecting through the same panel. All are provided with gas tight seals with the panel 2.

Above the transformer 12, but within the right side of the casing, are mounted low voltage circuit breakers 15 and 16 operated through a linkage 17 from a bell crank device 18 on the shaft 19. One of the arms of the bell crank device 18 connects to linkage 17, and the other connects with a link 20 in turn rotated by lever 22 on the shaft 24 carrying operating handle 25. There is also a suitable gas seal on shaft 24 where it passes through the panel to an operating handle 25.

On the high voltage side of the line A—A and mounted inside housing 10 is a high voltage disconnect or circuit interrupter, generally indicated at 30. Operating dials 31 and 32 are located on the outside of the panel 2 and each has a connection for operation by a switch stick. Circuit interrupter 30 is for sectionalizing the circuits to the high voltage side of the transformer. The left dial, indicated as 31, is for opening and closing the circuit to the transformer from the high voltage terminals H1A and H2A. The dial 32 can be operated to connect and disconnect the circuit from the terminals H1B and H2B to the transformer. The fixed terminals H1A and H2A can be connected with a high voltage loop A. The terminals H1B and H2B can be similarly connected with a high voltage loop B. Connected in these circuits between the fixed terminals of the circuit interrupter 30 and the transformer coil are a pair of fuses 33 and 36 shown in FIG. 3. A bracket 35 mounted on the frame 14 supports the fuses.

Preferably, the side walls 2, 3, 4 and 5 and top cover 6 are of sheet metal, and, where extra cooling is necessary, side walls 3 and 5 may be finned, as shown by dotted lines. All portions of the casing might be finned if that was desirable.

Figure 5:
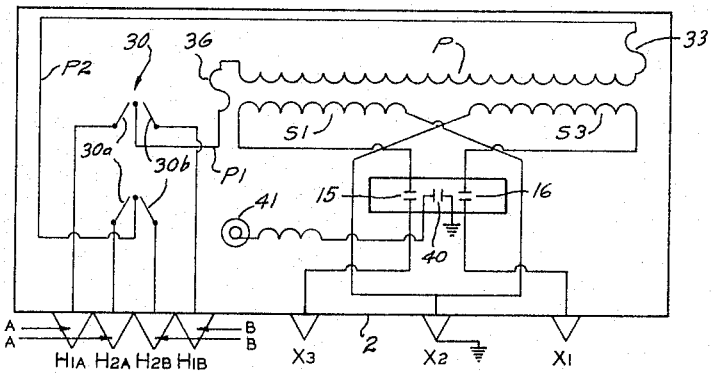
FIG. 5 is a wiring diagram illustrating the manner of interconnection of the major electrical components in the transformer housing shown in FIG. 1.

Turning now to FIG. 5, high voltage power may be supplied from a high voltage loop circuit A to terminals H1A and H2A. A second high tension loop circuit B may be connected through terminals H1B and H2B with the transformer. The former terminals H1A and H2A are in turn electrically connected with a pair of blades 30A operated by the dial 31. Fixed terminals H1B and H2B are in turn connected with blades 30B operated by the dial 32. When either set of blades 30A or 30B are closed, the primary P of the transformer is connected through the lines P1 and P2. This in turn will energize the secondaries S1 and S3 which are in turn connected by circuit breakers 15 and 16, respectively, with fixed low tension terminals X1 and X3. The neutral low voltage terminal X2 is loop connected with a central tap between the secondary S1 and secondary S3. Operated simultaneously with the circuit breakers 15 and 16 is a switch 40 connecting the signal lamp 41 with ground. When the circuit breakers 15 and 16 are connected with their respective low voltage terminals, the signal lamp 41 will be energized to indicate terminals on the low voltage side are energized.

The arrangement of parts, or components, of the transformer within the housing 10, as described above, is such that a circulation of gas is created when the transformer 12 is operating. The path of circulation is shown by the small arrows C in FIG. 1. As these arrows indicate, gas surrounding the transformer 12 is heated and rises vertically to the top cover 6, across the underside of the cover to side wall 3, and down the side wall 3 to the base 1. Some heat carried away from the transformer by the gas is lost to the cooler cover 6, and still more as the gas flows down the cool side wall 3 remote from the transformer on its return to recirculate. The circuit interrupters 30 are located at the part of the path of circulation where the circulation is strong and the gas movement is most pronounced. Accordingly, any metal vapors V released on opening the contacts of the circuit interrupters 30 are conveyed by gas circulation directly to a cool wall and condensed on that wall. This removes the metal vapor V contaminant from the gas almost completely before the gas recirculates over the transformer and its electric components. The results obtained by the use of gas as the dielectric coolant, and proper location of the circuit interrupters with respect to the natural path of circulation, insure continued safe operation of the transformer, regardless of the number of times the circuits may be opened. This is true not only of the circuit interrupters 30, but also of the circuit breakers 15 and 16 which likewise may be carrying heavy current. This represents a concept not before appreciated, although gas-cooled transformers have been in use for some time. Generally the transformers of this kind use a gas pressure of two or three atmospheres in order to obtain the same dielectric properties as transformer oil. The fact that the gas is under considerable pressure increases its density, but this fact does not detract from, but contributes to, the effectiveness of the method of operation herein disclosed.

Changes in and modifications of the construction described may be made without departing from the spirit of our invention or sacrificing its advantages.

Having thus described the invention, what is claimed and desired to be secured by Letters Patent is:

1. In an electric power distribution system, the combination comprising, a transformer having a primary winding, a circuit interrupter having at least two poles, one of said poles being connected to said primary winding, a high voltage supply conductor connected to another pole of said circuit interrupter, and a gas-filled housing surrounding said transformer and circuit interrupter, said housing having a vertical dimension substantially greater than the vertical dimension of said transformer and a horizontal dimension substantially greater than the horizontal dimension of said transformer, said transformer being disposed within said housing adjacent the lower extremity of the vertical dimension of said housing and near one extremity of the horizontal dimension thereof, and said circuit interrupter being disposed within said housing near the opposite extremities of said vertical and horizontal dimensions, whereby gas convection currents induced by heat generated in said transformer have a circulation path downwardly past said circuit interrupter and upwardly past said transformer, in succession, to cool said transformer.

2. The combination of claim 1 wherein the housing is a gas-tight enclosure, and the gas filling of said housing has a dielectric strength greater than that of air, whereby to suppress arcing at said circuit interrupter.

3. The combination of claim 1 wherein said circuit interrupter is disposed substantially wholly above said transformer.

4. The combination of claim 1 wherein said circuit interrupter has means operable from outside said housing to make and break electrical connection between the poles of said circuit interrupter.

References Cited by the Examiner
UNITED STATES PATENTS

| | | |
|---|---|---|
| 1,751,222 | 3/1930 | Styer et al. |
| 3,014,158 | 12/1961 | Nelson et al. _____ 174—52 X |
| 3,025,432 | 3/1962 | Giegerich _____ 174—52 X |
| 3,079,573 | 2/1963 | Smith et al. _____ 336—55 |

ROBERT K. SCHAEFER, *Primary Examiner.*

ROBERT S. MACON, *Examiner.*